(12) United States Patent
Yu

(10) Patent No.: US 10,293,410 B2
(45) Date of Patent: May 21, 2019

(54) EXTERNAL DEBURRING TOOL

(71) Applicant: Tsai Shun Yu, Taichung (TW)

(72) Inventor: Tsai Shun Yu, Taichung (TW)

( * ) Notice: Subject to any disclaimer, the term of this patent is extended or adjusted under 35 U.S.C. 154(b) by 0 days.

(21) Appl. No.: 15/651,766

(22) Filed: Jul. 17, 2017

(65) Prior Publication Data

US 2018/0147632 A1    May 31, 2018

(30) Foreign Application Priority Data

Nov. 25, 2016 (TW) .............................. 105138972 A
May 11, 2017 (TW) .............................. 106115647 A

(51) Int. Cl.
*B23B 5/16* (2006.01)
*B23B 51/10* (2006.01)

(52) U.S. Cl.
CPC ............ *B23B 5/167* (2013.01); *B23B 51/103* (2013.01); *B23B 2215/72* (2013.01); *B23B 2220/04* (2013.01); *B23B 2220/08* (2013.01); *B23B 2251/04* (2013.01)

(58) Field of Classification Search
CPC .......... B23B 5/167; B23B 5/168; B23B 5/16; B23B 2215/72; B23B 2220/04; B23B 51/103; B23B 2231/04
See application file for complete search history.

(56) References Cited

U.S. PATENT DOCUMENTS

| | | | | |
|---|---|---|---|---|
| 1,593,654 A * | 7/1926 | Ermoshkin | ............ | B27G 15/00 144/2.1 |
| 3,754,832 A * | 8/1973 | Stickler | ................... | B23B 5/167 408/227 |
| 4,239,427 A * | 12/1980 | Walton, II | ............... | B27G 15/00 408/213 |
| 9,676,041 B2 * | 6/2017 | Allen | ..................... | B23B 51/009 |
| 9,821,393 B2 * | 11/2017 | Su | ........................... | B23G 9/003 |

(Continued)

FOREIGN PATENT DOCUMENTS

| | | | | |
|---|---|---|---|---|
| DE | 1402898 A1 * | 7/1969 | ............. | B23B 5/167 |
| DE | 4218886 A1 * | 12/1993 | ............. | B23G 1/261 |

(Continued)

OTHER PUBLICATIONS

Machine translation, German Patent Document, DE4218886, Zacher, K., Dec. 16, 1993.*

(Continued)

*Primary Examiner* — Daniel W Howell
*Assistant Examiner* — Chwen-Wei Su
(74) *Attorney, Agent, or Firm* — Muncy, Geissler, Olds & Lowe, P.C.

(57) ABSTRACT

A deburring tool includes a deburring head and a shaft portion connected to the deburring head. The deburring head includes a conical hollow body, a primary cutting edge and a secondary cutting edge both formed on the conical hollow body. The conical hollow body has at least one flute extending between interior and exterior conical surfaces of the conical hollow body, and at least one recessed cutout defined in the interior conical surface. The primary cutting edge is formed at a junction of a wall surface of the flute and a bottom surface of the recessed cutout. The secondary cutting edge is formed at a junction of a wall surface of the recessed cutout and the interior conical surface.

6 Claims, 8 Drawing Sheets

(56) References Cited

U.S. PATENT DOCUMENTS

2013/0291386 A1* 11/2013 Gambino ................. B23B 5/08
              30/95
2016/0082517 A1   3/2016 Ferguson

FOREIGN PATENT DOCUMENTS

JP          62028106 A  *  2/1987  ........... B23B 51/102
WO   WO 2018025173 A1 *  2/2018  ............. B23B 5/167

OTHER PUBLICATIONS

Machine translation, Japan Patent Document, JP 62028106 A, Isaka, M., Feb. 6, 1987.*

* cited by examiner

EXTERNAL DEBURRING TOOL

BACKGROUND OF THE INVENTION

1. Field of the Invention

The present invention relates to a deburring tool, and more particularly to an external deburring tool.

2. Description of the Related Art

Almost all installations require the pipe to be cut and the cutting action, whether performed by a saw or a tube cutter, causes the formation of a burr or ridge at the cut end of the pipe. In some instances burrs are formed at the interior of the cut end, and in other instances at the exterior of the cut end. Such burrs must be removed to condition the pipe to receive or to mount a pipe fitting.

One type of deburring tool is illustrated in U.S. Pat. No. 2016/0082517. This deburring tool has a hollow top portion having an interior conical surface and an exterior conical surface. The top portion has a plurality of flutes formed therein and extending between the interior and exterior surfaces. Each of the flutes has a cutting edge formed at the interior conical surface. In operation, rotation of the deburring tool about a longitudinal axis removes burrs projecting from a pipe or a bar stock contacting the interior conical surface.

SUMMARY OF THE INVENTION

It is an object of the present invention to provide an improved deburring tool suited for rapidly and uniformly removing burrs from outer circumferential edges at the end of a pipe or a bar stock caused by cutting thereof.

Briefly described, the deburring tool of this invention comprises a deburring head and a shaft portion attached to the deburring head. The deburring head includes a conical hollow body, a primary cutting edge and a secondary cutting edge. The conical hollow body has an interior cone surface, an exterior conical surface, at least one flute extending between the interior and exterior conical surfaces, and at least one recessed cutout defined in the interior conical surface. The flute has opposed first and second wall surfaces. The first wall surface of the flute adjoins a first area of the interior conical surface at an obtuse angle, and the second wall surface of the flute adjoins a second area of the interior conical surface in which the recessed cutout is defined. The recessed cutout has a bottom surface adjoining the second wall surface of the flute at an acute angle, and a wall surface adjoining a third area of the interior conical surface. It is noted that the primary cutting edge is formed at a junction of the second wall surface of the flute and the bottom surface of the recessed cutout; and the secondary cutting edge is formed at a junction of the wall surface of the recessed cutout and the third area of the interior conical surface. In addition, the shaft portion has one end joined to the conical hollow body and the other end provided for engagement with a driving tool.

Preferred embodiments of the invention may have the following additional characteristics, either alone or in combination:

The conical hollow body preferably includes at least three flutes each of which has inner and outer openings formed in the respective interior and exterior conical surfaces. The outer openings of the flutes have their longitudinal axes intersecting at a point on an axis of the conical hollow body. And, the flutes are arranged along a rotation direction at intervals and each is inclined from the outer opening to the inner opening.

The deburring head may further comprises a neck portion having one end integrally formed with the conical hollow body, and the other portion having a receptacle axially defined in an end face thereof. The shaft portion has first and second connectors at opposite ends thereof, wherein the first connector is detachably engaged in the receptacle of the neck portion, and the second connector is provided for engagement of the driving tool.

The foregoing and other objectives, features, and advantages of the invention will be more readily understood upon consideration of the following detailed description of the invention, taken in conjunction with the accompanying drawings.

DETAILED DESCRIPTION OF EMBODIMENTS

Figure 1:
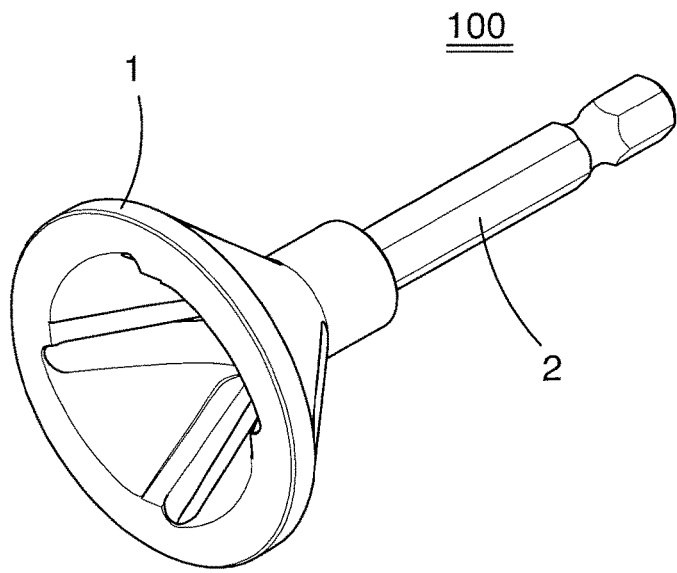
FIG. 1 is a perspective view of a deburring tool in accordance with a first embodiment of the present invention.

Referring to FIGS. 1 to 9, there is shown a first embodiment of the deburring tool 100. Firstly, as shown in FIG. 1, the deburring tool 100 generally includes a deburring head 1 and a shaft portion 2 inserted in a rear end of the deburring head 1.

Figure 2:
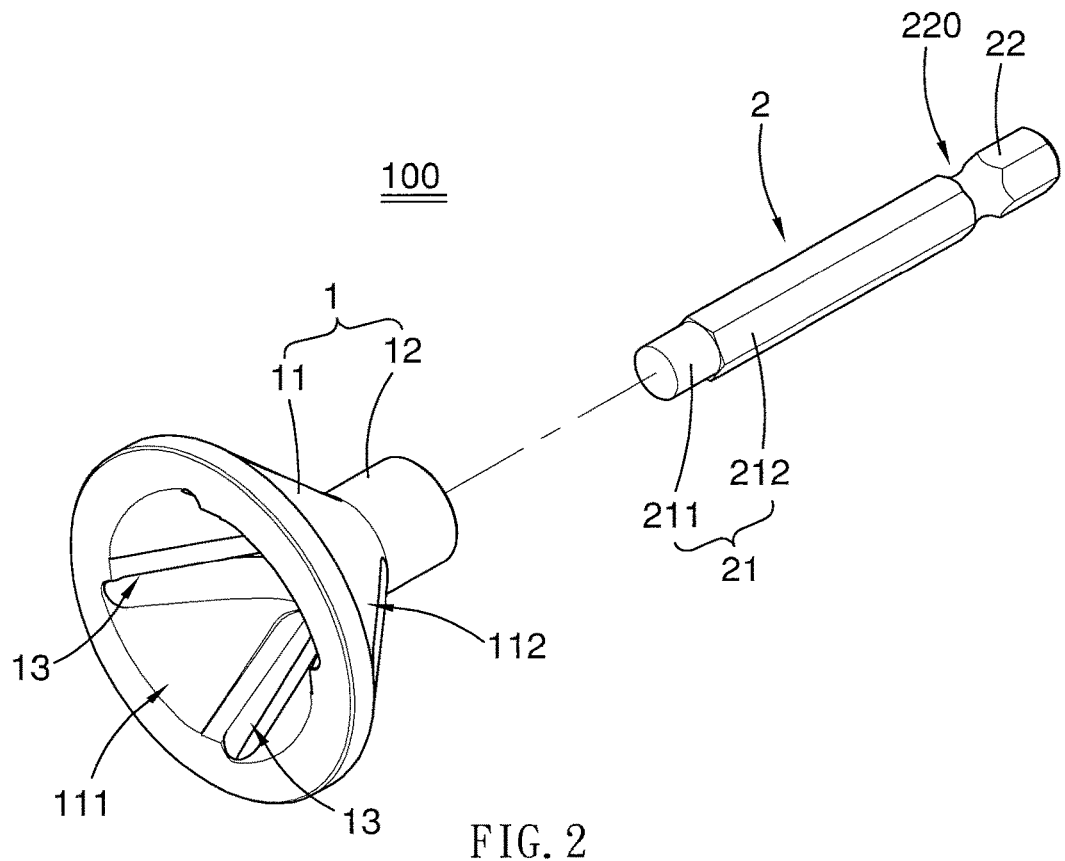
FIG. 2 is an exploded perspective view of the deburring tool shown in FIG. 1.

As shown in FIG. 2, the deburring head 1 includes a conical hollow body 11, a neck portion 12 extending from the rear end of the conical hollow body 11, and a plurality of cutting portions 13 formed on an interior conical surface 111 of the conical hollow body 13 opposite to the exterior conical surface 112. The neck portion 12 has one end integrally formed on the rear end of the conical hollow body 11, and the other end having a receptacle 120 (FIG. 3) axially defined in an end face thereof for reception of the shank portion 2. The receptacle 120 of the neck portion 12 extends through the whole length of the neck portion 12 and is in communication with the inside of the conical hollow body 11.

Figure 3:
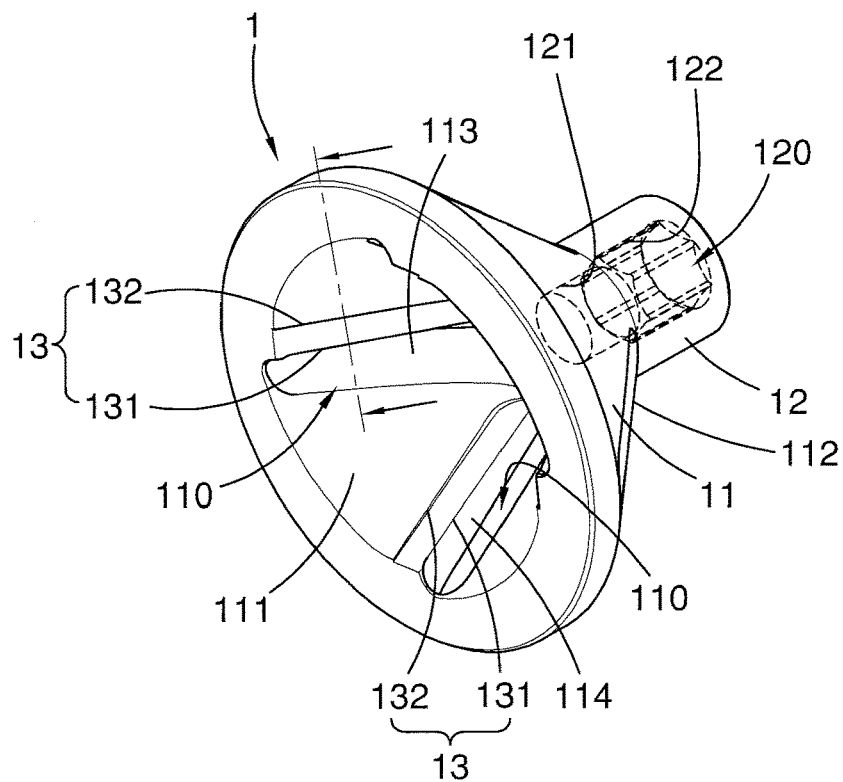
FIG. 3 is an enlarged view of a deburring head of the deburring tool shown in FIG. 2, taken from an angle.
Figure 4:
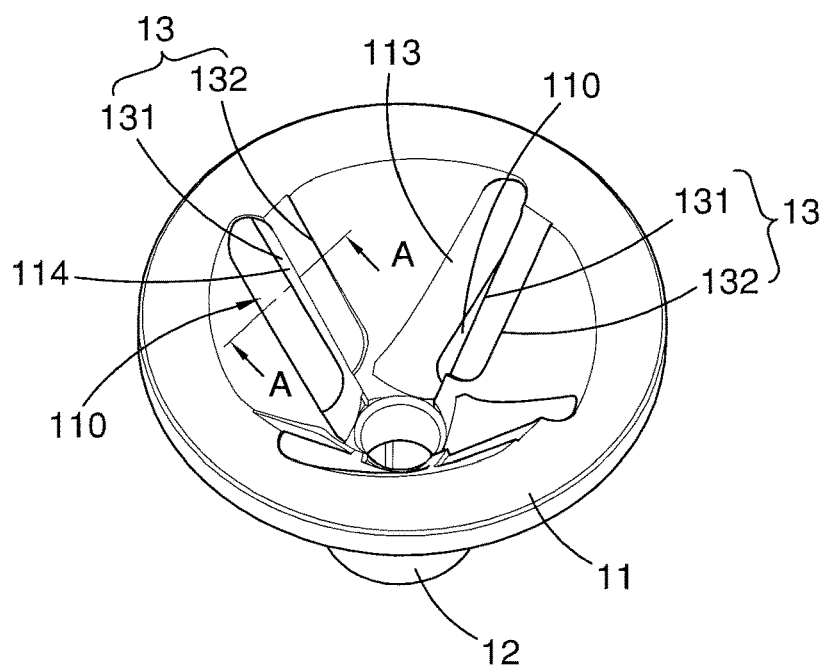
FIG. 4 is another enlarged view of the deburring head shown in FIG. 2, taken from another angle.
Figure 5:
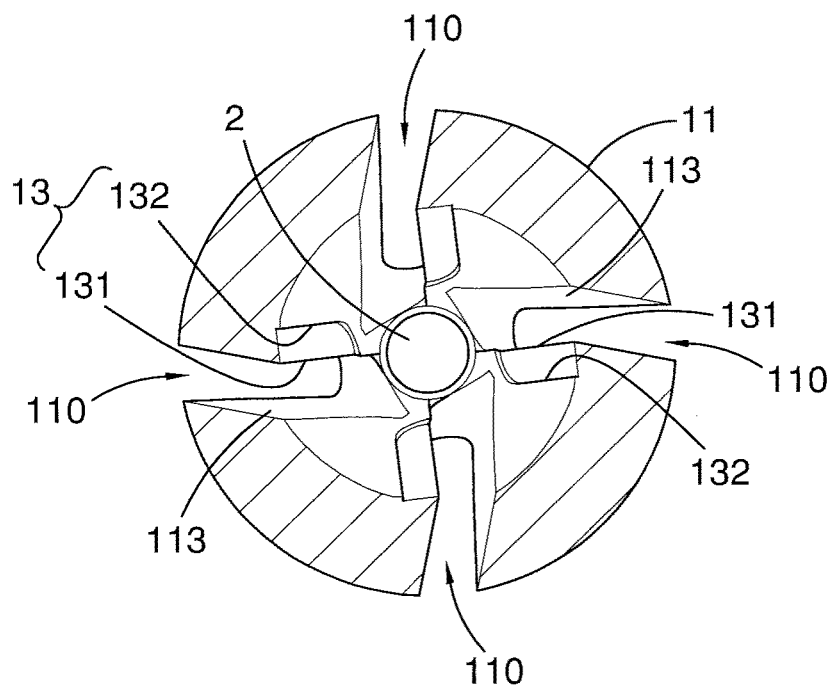
FIG. 5 is a cross-sectional view of the deburring head shown in FIG. 3.

Referring FIGS. 3 to 5, the conical hollow body 11 of the deburring head 1 further includes a plurality of flutes 110 extending through the interior and exterior conical surfaces 111, 112. The cutting portions 13 are disposed adjacent to the flutes 110 respectively, and each includes a primary cutting edge 131 and a secondary cutting edge 132.

Figure 4A:
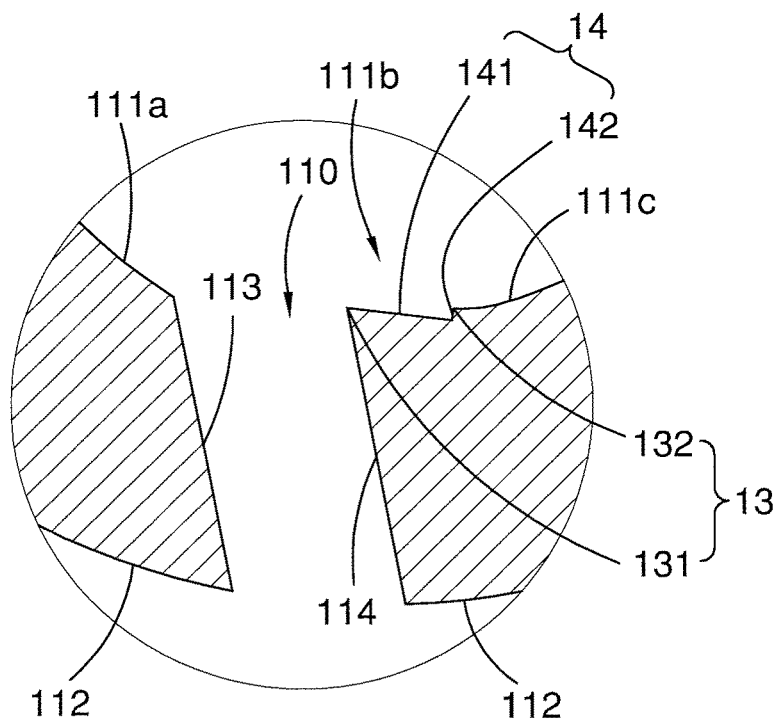
FIG. 4A is a partial, cross-sectional view of the deburring head shown in FIG. 4, taken along the line A-A.

More specifically, as shown in FIG. 4A, each of the flutes 110 has opposed first and second wall surfaces 113, 114. The first wall surface 113 adjoins a first area 111a of the interior conical surface 111 at an obtuse angle. The second wall surface 114 adjoins a second area 111b of the interior conical surface 111. In particular, the recessed cutout 14 is formed in the second area 111b of the interior conical surface 111 by using a milling cutter, for example. The recessed cutout 14 has a bottom surface 141 adjoining the second wall surface 114 of the flute 110 at an acute angle, and a small, wall surface 142 adjoining a third area 111c of the interior conical surface 111. It is noted that the primary cutting edge 131 is formed at the junction of the second wall surface 114 of the flute 110 and the bottom surface 141 of the recessed cutout 14; and the secondary cutting edge 132 is formed at the junction of the wall surface 142 of the recessed cutout 14 and the third area 111c of the interior conical surface 111. The primary and secondary cutting edges 131, 132 work together to perfectly remove burrs from a pipe or a bar stock.

Figure 6:
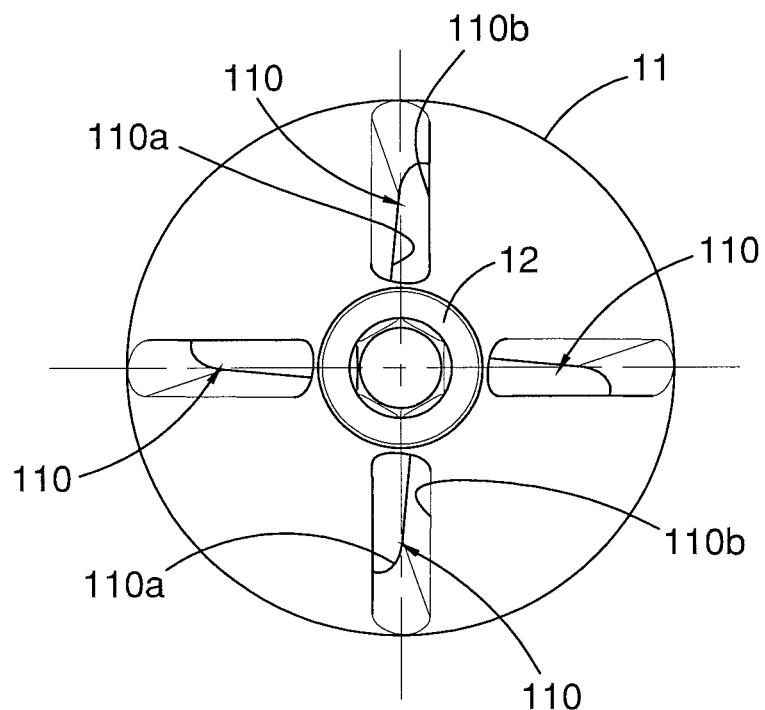
FIG. 6 is a rear view of the deburring head shown in FIG. 3.
Figure 7:
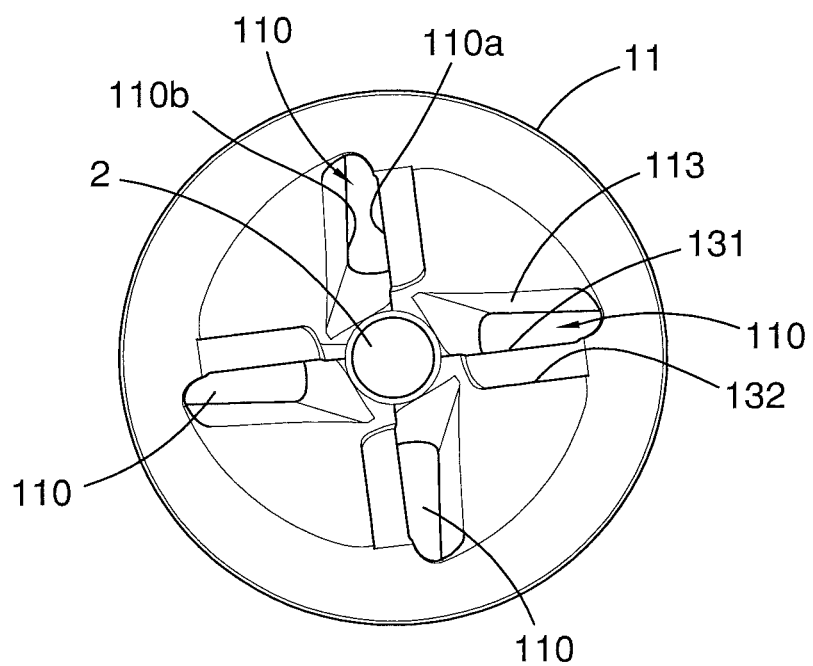
FIG. 7 is a front view of the deburring head shown in FIG. 3.

The conical hollow body 11 of the deburring head 1 may have three or more flutes 110 for a better deburring operation, and each has inner and outer openings 110a, 110b respectively formed in the interior and exterior conical surfaces 111, 112, as depicted in FIG. 6 or 7. The flutes 110 are arranged along a rotation direction (clockwise) at intervals and each is inclined from the outer opening 110b to the inner opening 110a for enhancing the cutting ability of the tool. However, as shown in FIG. 6, the outer openings 110b of the flutes 110 have their longitudinal axes intersecting at a point on an axis of the conical hollow body 11. That is, these outer openings 110b are arranged radially, not following the rotation direction. In this manner, the flutes 110 of the conical hollow body 11 can be made more preciously.

Referring again to FIG. 2, the shaft portion 2 has one end joined to the conical hollow body 11 of the deburring head 1, and the other end provided for engagement with a driving tool, such as an electric drill. In this embodiment, the shaft portion 2 is formed with first and second connectors 21, 22 at opposite ends thereof. The first connector 21 is detachably engaged in the receptacle 120 of the neck portion 12 of the deburring head 1. The second connector 22 has a cross-section of a polygonal shape to be inserted in a drill chuck of the driving tool. Moreover, an annular groove 220 is formed in a periphery of the polygonal second connector 22 for positioning of the drill chuck.

Figure 8:
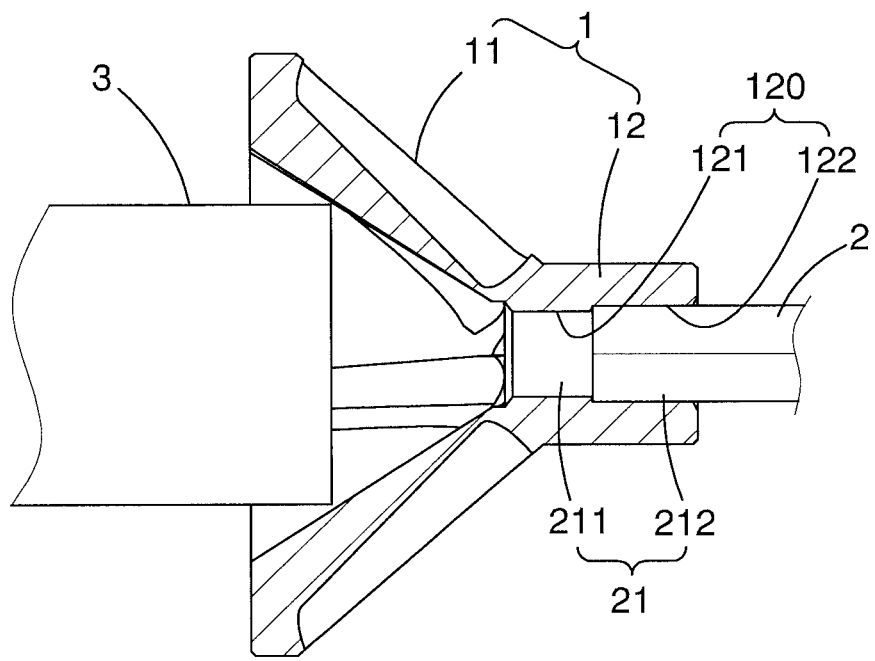
FIG. 8 is a partial, cross-sectional view of the deburring tool and a workpiece to be chamfered.

As shown in FIG. 8, the receptacle 120 of the neck portion 12 of the deburring head 1 includes a proximal, cylindrical segment 121 and a distal, polygonal segment 122. On the other hand, the first connector 21 of the shaft portion 2 includes a cylindrical section 211 and a polygonal section 212 adjacent to the cylindrical section 211. In particular, the cylindrical section 211 of the first connector 21 of the shaft portion 2 is engaged in the cylindrical segment 121 of the receptacle 120 of the neck portion 12 of the deburring head 1 with an interference fit; and the polygonal section 212 of the first connector 21 of the shaft portion 2 is engaged in the polygonal segment 122 of the receptacle 120 of the neck portion 12 of the deburring head 1 with a clearance fit. In this manner, the shaft portion 2 can not only be tightly inserted in the receptacle 120 of the neck portion 12 by virtue of the interference fit, and but also be easily operated for removal from the receptacle 120 by virtue of the clearance fit.

Figure 9:
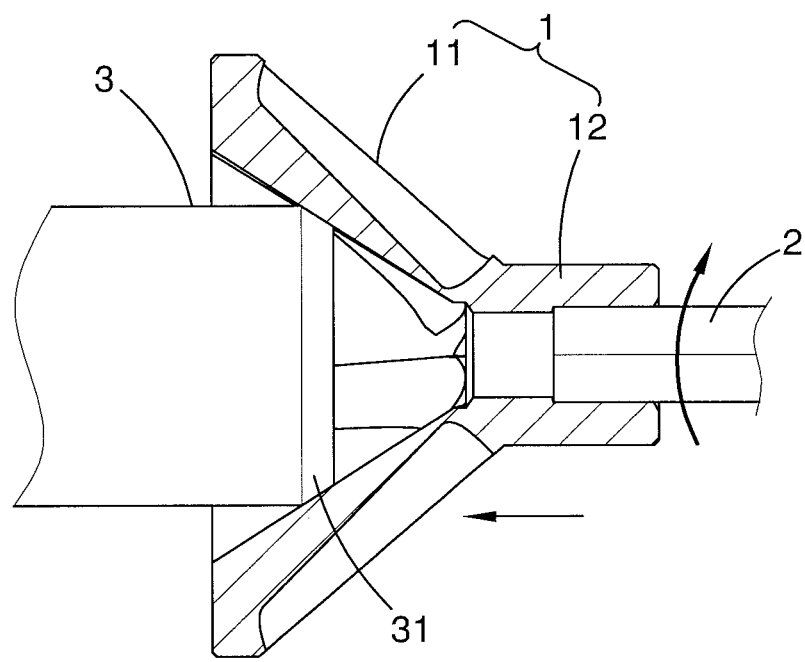
FIG. 9 is a view similar to FIG. 8, showing that the workpiece is being chamfered.

When in use, as shown in FIG. 8, the deburring tool 100 is connected to an electric drill (not shown) and rotates either counter-clockwise (or clockwise) depending on the nature of the workpiece (bar stock or pipe) 3 being deburred and the configuration of flutes 110. As shown in FIG. 9, the cutting portions 3 then cut the burrs from the end 31 of the workpiece 3. It is noted that the conical hollow body 11 of the deburring head 1 can accommodates different sizes of workpiece because of its trumpet-like shape.

Figure 10:
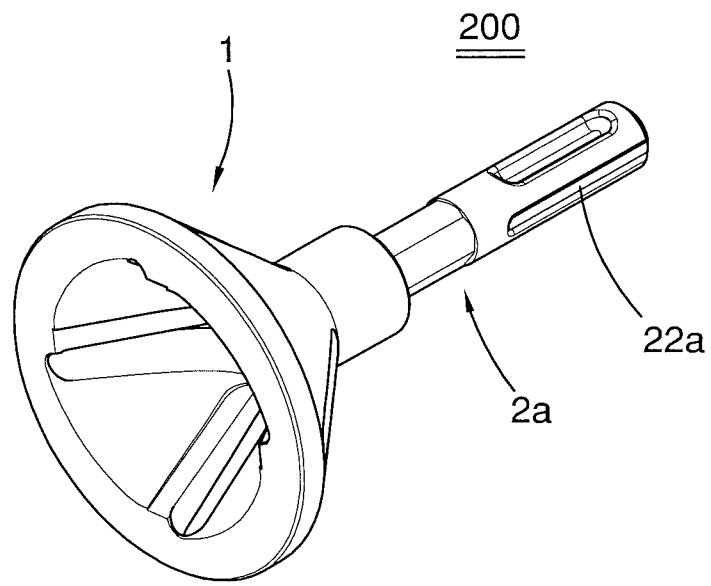
FIG. 10 is a perspective view of a deburring tool in accordance with a second embodiment of the present invention.
Figure 11:
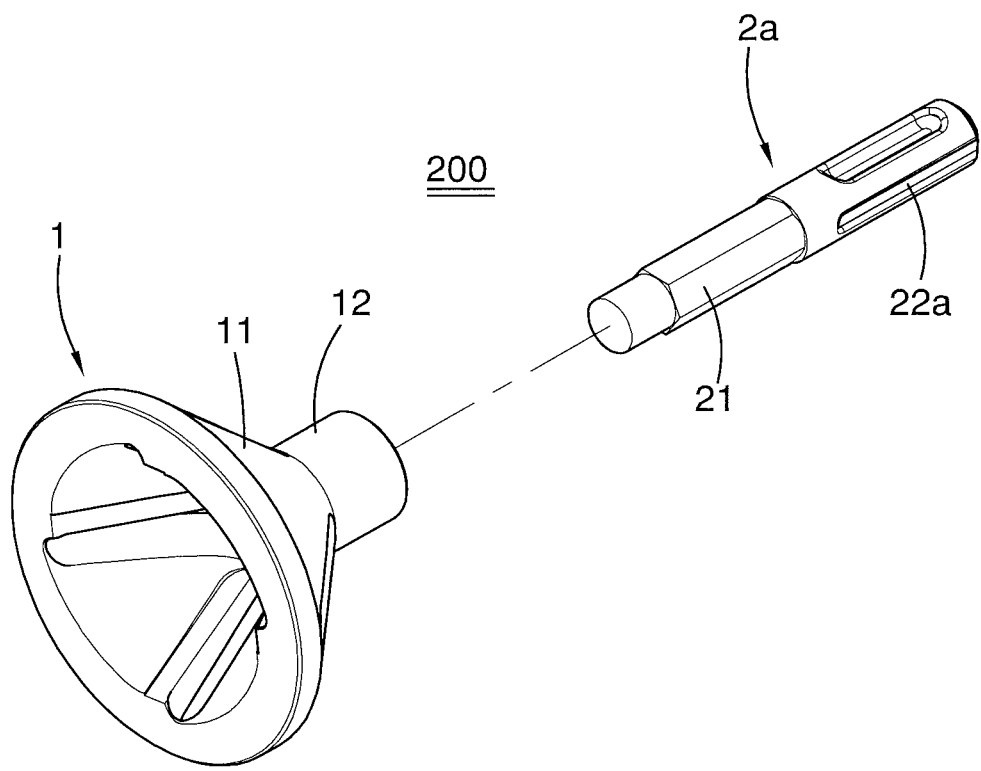
FIG. 11 is an exploded perspective view of the deburring tool shown in FIG. 10.

With reference to FIGS. 10 and 11, a deburring tool 200 is provided according to a second embodiment of the present invention. The deburring tool 200 of the second embodiment is substantially identical to that of the first embodiment, except that the second connector 22 of the shaft portion 2 of FIG. 2 is replaced with a SDS connector 22a of the shaft portion 2a. The SDS connector 22a generally has four grooves formed therearound for compliance with a slotted drive system (SDS).

Figure 12:
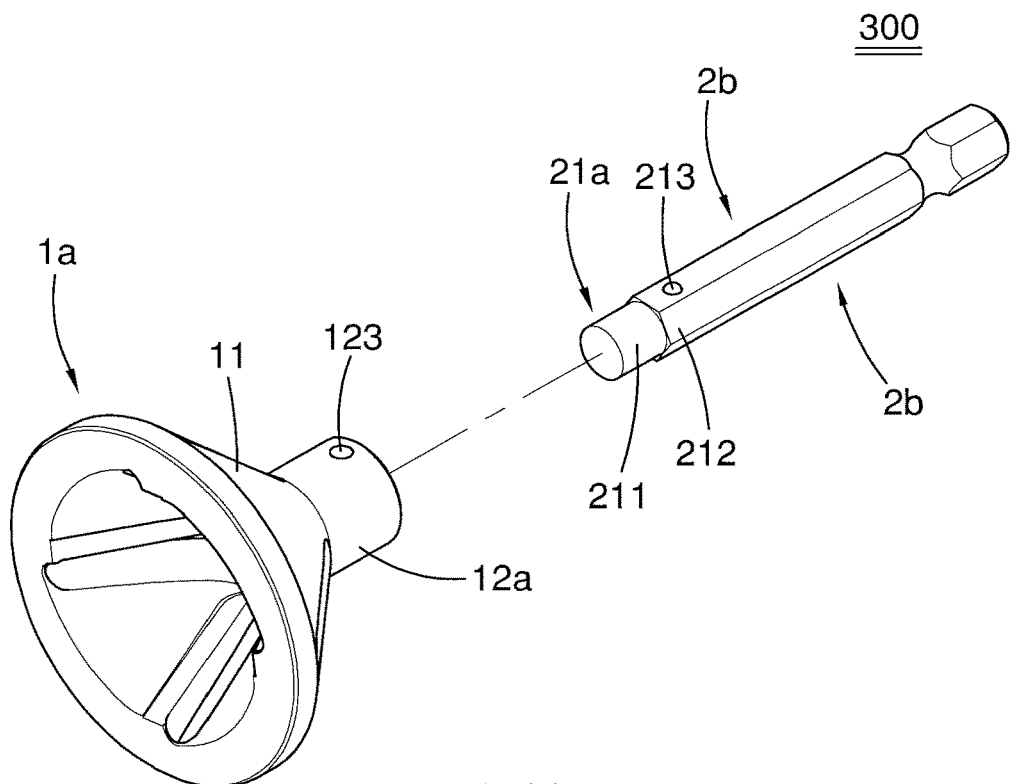
FIG. 12 is an exploded perspective view of a deburring tool in accordance with a third embodiment of the present invention.
Figure 13:
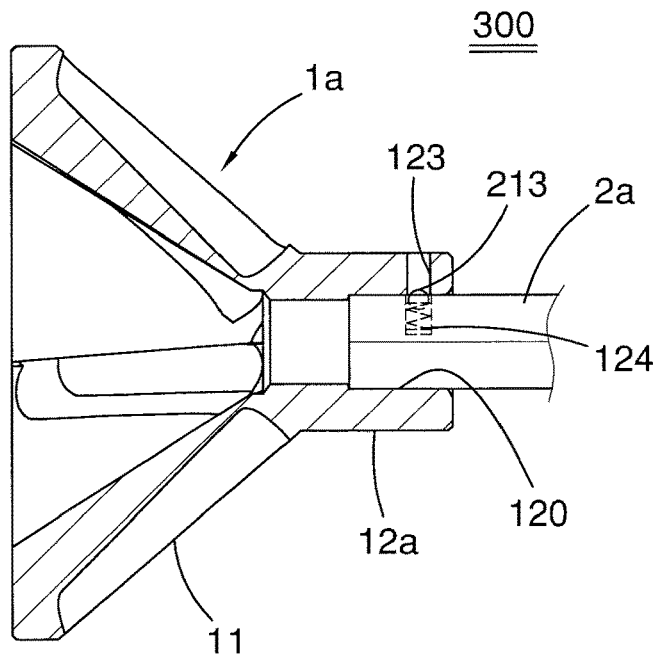
FIG. 13 is a cross-sectional view of the deburring tool shown in FIG. 12.

With reference to FIGS. 12 and 13, a deburring tool 300 is provided according to a third embodiment of the present invention. The deburring tool 300 of the third embodiment is substantially identical to that of the first embodiment, except that the first connector 21 of the shaft portion 2 further includes a ball plunger 213 with a spring 124 disposed at a periphery of the polygonal section 212; and the neck portion 12a of the deburring head 1a further has a retaining bore 123 defined in a peripheral wall thereof and in communication with the receptacle 120 to receive the ball plunger 213 of the first connector 21, as shown in FIG. 13. This ensures that the shank portion 2b can be firmly engaged in the receptacle 120 of the neck portion 12a of the deburring head 1a, and the life of the deburring tool 300 may therefore be lengthened.

Figure 14:
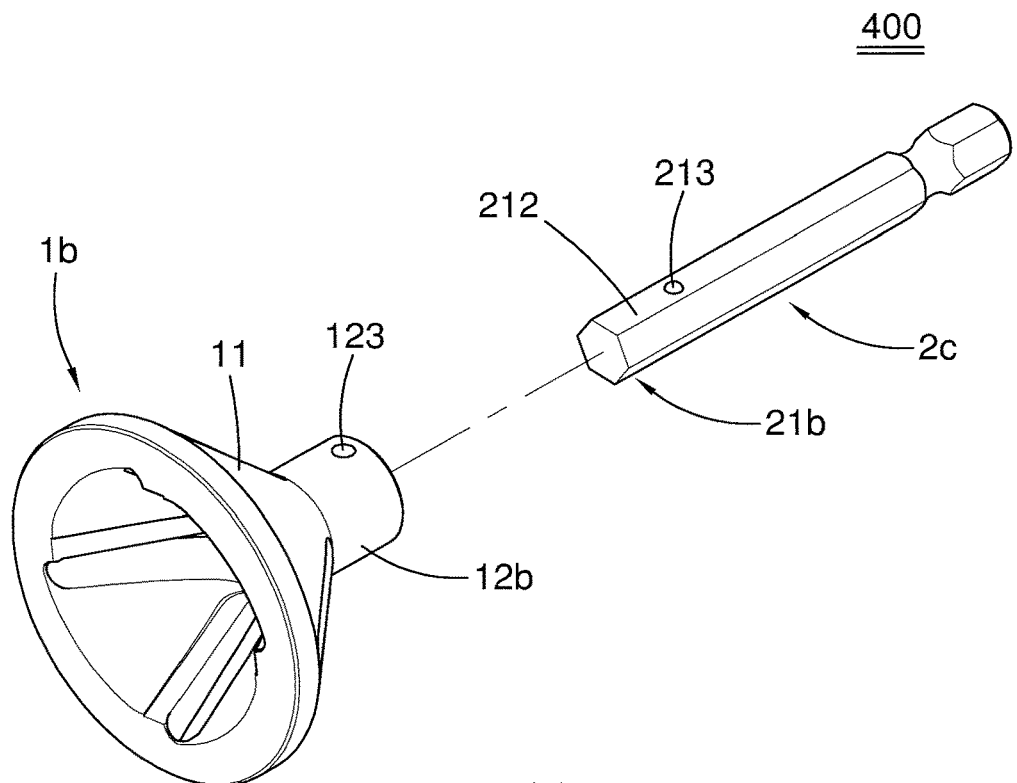
FIG. 14 is an exploded perspective view of a deburring tool in accordance with a fourth embodiment of the present invention.
Figure 15:
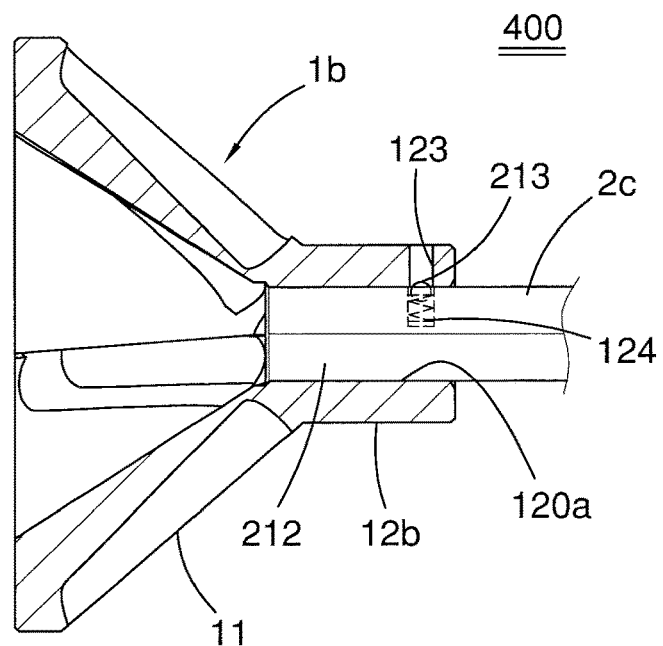
FIG. 15 is a cross-sectional view of the deburring tool shown in FIG. 14.

With reference to FIGS. 14 and 15, a deburring tool 400 is provided according to a fourth embodiment of the present invention. The deburring tool 400 of the third embodiment is substantially identical to that of the third embodiment, except that the receptacle 120 of the neck portion 12a of the deburring head 1a of FIG. 13 is replaced by a receptacle 120a of FIG. 15 in which no cylindrical section is included. In this fourth embodiment, the receptacle 120a of the neck portion 12b of the deburring head 1b has a polygonal cross-section along its whole length; and the first connector 21b of the shaft portion 2c includes a polygonal end portion 212 fitted in the receptacle 120a of the neck portion 12b of the deburring head 1b. Besides, the first connector 21b of the shaft portion 2c further includes a ball plunger 213 disposed at a periphery of the polygonal end portion 212, and the neck portion 12b of the deburring head 1b further has a retaining bore 123 defined in a peripheral wall thereof and in communication with the receptacle 120a to receive the ball plunger 213 of the first connector 21b, as shown in FIG. 15.

It should be evident that this disclosure is by way of example and that various changes may be made by adding, modifying or eliminating details without departing from the fair scope of the teaching contained in this disclosure.

What is claimed is:

1. A deburring tool, comprising:

a deburring head including a conical hollow body having an interior conical surface, an exterior conical surface, at least one flute extending between the interior and exterior conical surfaces, and at least one recessed cutout defined in the interior conical surface, the flute having opposed first and second wall surfaces, the first wall surface adjoining a first area of the interior conical surface at an obtuse angle, the second wall surface adjoining a second area of the interior conical surface, the recessed cutout being defined in the second area of the interior conical surface and having a bottom surface adjoining the second wall surface of the flute at an acute angle and a wall surface adjoining a third area of the interior conical surface; a primary cutting edge formed at a junction of the second wall surface of the flute and the bottom surface of the recessed cutout; and a secondary cutting edge formed at a junction of the wall surface of the recessed cutout and a third area of the interior conical surface, and in a rotating direction of the deburring head, with the flute being in front, the secondary cutting edge being behind, and the primary cutting edge being between the flute and the secondary cutting edge, the primary and secondary cutting edges work together to cut an end of a workpiece in the conical hollow body; and a shaft portion having one end joined to the conical hollow body and the other end provided for engagement with a driving tool.

2. The deburring tool as recited in claim 1, wherein the at least one flute of the conical hollow body includes at least three flutes, each of which has inner and outer openings formed in the respective interior and exterior conical surfaces, and the outer openings of the flutes have their longitudinal axes intersecting at a point on an axis of the conical hollow body; the flutes are arranged along the rotation direction at intervals and each is inclined from the outer opening to the inner opening.

3. The deburring tool as recited in claim 1, wherein the deburring head further comprises a neck portion having one end integrally formed with the conical hollow body, and the other portion having a receptacle axially defined in an end face thereof; the shaft portion has first and second connectors at opposite ends thereof, wherein the first connector is detachably engaged in the receptacle of the neck portion, and the second connector is provided for engagement of the driving tool.

4. The deburring tool as recited in claim 3, wherein the receptacle of the neck portion of the deburring head includes a proximal, cylindrical segment and a distal, polygonal segment, and the first connector of the shaft portion includes a cylindrical section and a polygonal section adjacent to the cylindrical section, and wherein the cylindrical section of the first connector of the shaft portion is engaged in the cylindrical segment of the receptacle of the neck portion of the deburring head with an interference fit, and the polygonal section of the first connector of the shaft portion is engaged in the polygonal segment of the receptacle of the neck portion of the deburring head with a clearance fit.

5. The deburring tool as recited in claim 3, wherein the receptacle of the neck portion of the deburring head includes a proximal, cylindrical segment and a distal, polygonal segment, the first connector of the shaft portion includes a cylindrical section fitted in the cylindrical segment of the receptacle, and a polygonal section fitted in the polygonal segment of the receptacle, the first connector of the shaft portion further includes a ball plunger disposed at a periphery of the polygonal section, and the neck portion of the deburring head further has a retaining bore defined in a peripheral wall thereof and in communication with the receptacle to receive the ball plunger of the first connector.

6. The deburring tool as recited in claim 3, wherein the receptacle of the neck portion of the deburring head has a cross-section of a polygonal shape, the first connector of the shaft portion includes a polygonal end portion fitted in the receptacle of the neck portion of the deburring head, the first connector of the shaft portion further includes a ball plunger disposed at a periphery of the polygonal end portion, and the neck portion of the deburring head further has a retaining bore defined in a peripheral wall thereof and in communication with the receptacle to receive the ball plunger of the first connector.

* * * * *